A. COPELAND, Jr.
Cotton Gin.
No. 36. Reissued Feb. 12, 1842.
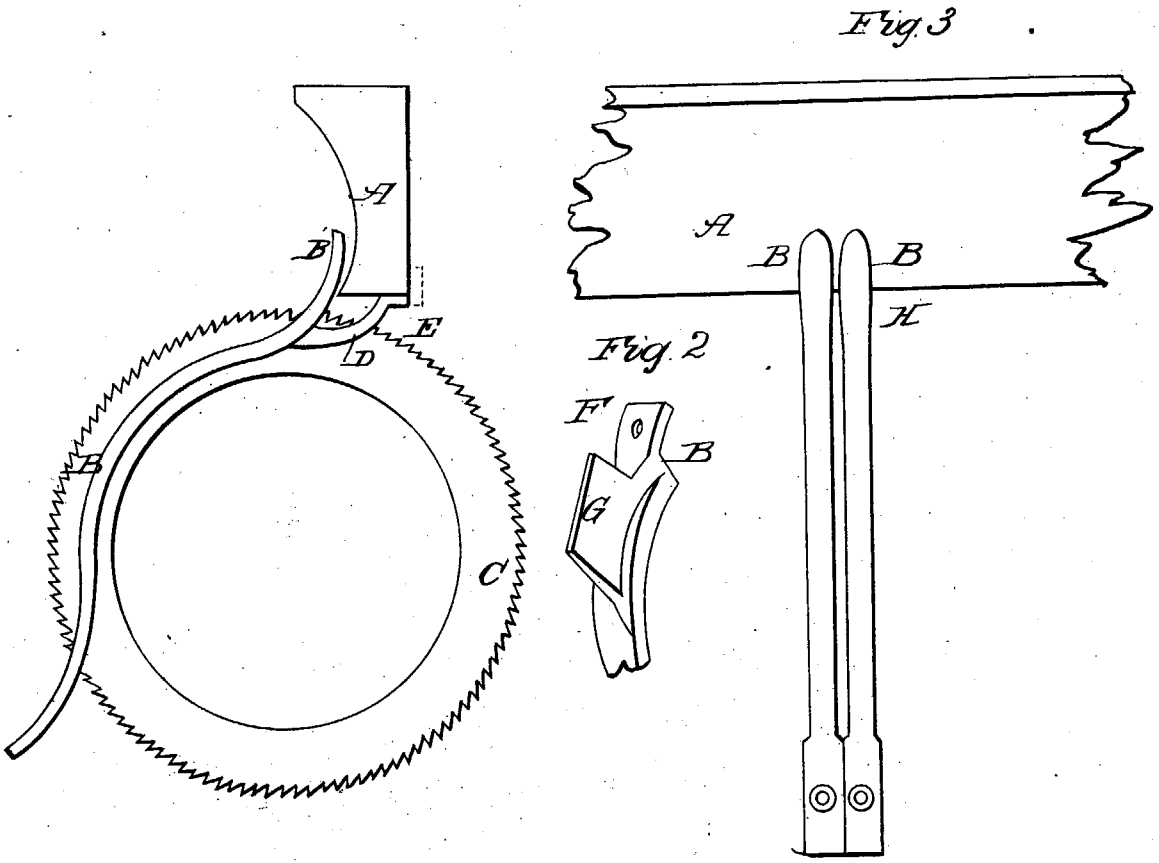
WITNESSES.
William Phillips
Wm. H. Crafts
INVENTOR.
Asa Copeland Jr
N. PETERS. Photo-Lithographer. Washington, D. C.

UNITED STATES PATENT OFFICE.

ASA COPELAND, JR., OF BRIDGEWATER, MASSACHUSETTS.

IMPROVEMENT IN THE MANNER OF CONSTRUCTING AND AFFIXING THE RIBS OF SAW-GINS FOR GINNING COTTON.

Specification forming part of Letters Patent No. 1,547, dated April 8, 1840; Reissue No. 36, dated February 12, 1842.

*To all whom it may concern:*

Be it known that I, ASA COPELAND, Jr., of Bridgewater, in the county of Plymouth and State of Massachusetts, have made certain Improvements in the Manner of Constructing and Affixing the Ribs or Grates of Saw-Gins for Ginning Cotton; and I do hereby declare that the following is a full and exact description thereof.

In the saw-gin as ordinarily constructed the cotton is liable to collect in the spaces between the ribs and around them above the point where the saws operate, thus choking or clogging the grate and preventing the rising and free escape of the fibers and seed therefrom. To obviate this inconvenience, instead of attaching the ribs by their upper ends directly to the part usually denominated the "breast" or "grate fall," I in general extend a brace or arm out from near the upper ends of said ribs, by which to attach them to the breast, in such a manner as that they shall stand out from said breast and leave a free space of a fourth of an inch (more or less) for the escape of the cotton.

The attachment may be made to the front, bottom, or back of the breast, and the mode in which this is effected will admit of much much variation without departing from the general principle upon which the improvement is founded.

In the accompanying drawings, Figure 1 represents a section of the breast A, with a rib, B, attached to it, C being one of the saws. D is a brace or arm extending out from the under side of the rib and attached by a screw to the under side of the breast at E. I sometimes carry the end E upon the back side of the breast and screw it to that part, as shown by the dotted lines; or it may be carried up on the front and there attached. The arm or brace D may be round or of triangular, quadrangular, or other form, the particular form not being material, provided it be of sufficient strength to serve as a brace to the rib; but it is essential to my improvement that the brace be narrower than the rib, and accordingly that the space between each two adjacent braces be wider than between two adjacent ribs, so that the cotton carried by the saw may may pass freely between the braces, no part of the ginning or moting being done at the braces, and the space between them being so wide and free—say, from a third to a half of an inch or more—that there is no liability to clogging or obstruction at this part by the matting or accumulation of the cotton or other substances. The top end, B, stands at the distance of one-fourth of an inch, or nearly so, from the lower part of the breast, the distance increasing toward the extreme end, so as to remove all obstruction out of the way of the ascent of the fibers of cotton.

In the above-described arrangement the teeth of the saw pass between the ribs at a point above the branching off of the arm D, as shown in Fig. 1; but I sometimes omit this arm and attach the rib in another manner to the front of the breast, in which case it may be constructed as shown in Fig. 2, in which F is a piece extending above the point or upper end of the rib, through which it is screwed to the front of the breast, it being so formed as to sustain the end B of the rib at a distance from the breast similar to the part B in Fig. 1. G is a wing or thin plate standing out backward from the longitudinal center of the rib above the saw, and at its posterior edge let into or in contact with the breast, serving, like the arm before described, as a brace or support to the rib. The fibers of cotton pass freely upon each side of this wing or bracing plate and escape with the seed at the top. Although this mode of construction has been found to answer a good purpose, that first described is preferred.

Fig. 3 shows the form which I give to the faces or outsides of the ribs, A being a portion of the breast or grate fall, with two of the ribs attached thereto at the part H, where the saw passes. I widen them out, as shown in the drawings, so as to narrow the space between them, and then again narrow them off above the saw, to aid in affording an unobstructed rise and escape of the fibers and seeds in the usual manner of constructing this part of the rib of a cotton-gin.

I claim as my improvement and ask a patent for—

The bracing of the rib of a cotton-gin with a brace narrower than the rib, leaving a free space between the braces to allow the motes, dust, cotton fibers, and other substances to fall between them without causing any obstruction to the process of ginning, all as above described.

ASA COPELAND, JR.

Witnesses:
WILLARD PHILLIPS,
WM. A. CRAFTS.